United States Patent [19]
Riedel

[11] 3,937,122
[45] Feb. 10, 1976

[54] EXPANDING MASONRY ATTACHMENT PLUG

[75] Inventor: Josef Riedel, Sipplingen (Bodensee), Germany

[73] Assignee: Tox-Dubel-Werk, Richard W. Heckhausen KG, Germany

[22] Filed: Jan. 7, 1974

[21] Appl. No.: 431,346

[52] U.S. Cl. ........................................ 85/71; 85/83
[51] Int. Cl.² ........................................ F16B 13/10
[58] Field of Search ............... 85/84, 83, 82, 71, 70

[56] References Cited
UNITED STATES PATENTS

| | | | |
|---|---|---|---|
| 2,918,841 | 12/1959 | Poupitch | 85/71 |
| 3,143,916 | 8/1964 | Rice | 85/71 |
| 3,174,387 | 3/1965 | Fischer | 85/71 |
| 3,280,875 | 10/1966 | Fischer | 85/83 X |
| 3,283,642 | 11/1966 | Ott | 85/83 |
| 3,516,324 | 6/1970 | Berner | 85/84 X |
| 3,522,756 | 8/1970 | Von Wolff | 85/83 |
| 3,735,665 | 5/1973 | Mortensen | 85/71 |

FOREIGN PATENTS OR APPLICATIONS

| | | | |
|---|---|---|---|
| 387,262 | 1/1965 | Switzerland | 85/83 |
| 1,221,702 | 2/1971 | United Kingdom | 85/83 |
| 2,019,684 | 11/1971 | Germany | 85/83 |

Primary Examiner—Ramon S. Britts
Attorney, Agent, or Firm—Ostrolenk, Faber, Gerb & Soffen

[57] ABSTRACT

The specification describes an expanding masonry attachment plug, whose plug head has a wide insertion hole and whose shank, provided with a through hole, is divided by longitudinal slits into expanding segments. The latter join at the far end to form a plug foot. To enable use of the plug both in dense masonry material and also in light weight building materials the plug has the following features. Internally the expanding segments delimit a guide hole adapted to bring about expansion, with a diameter which is less than the diameter of the appropriate screw. The plug foot consists of a closed sleeve adapted to bring about a bending outwards of the expanding segments by axial compression or clamping of the shank, with a through hole for the cutting of a tension thread on complete driving of the screw into position.

10 Claims, 7 Drawing Figures

EXPANDING MASONRY ATTACHMENT PLUG

BACKGROUND OF INVENTION

1. Field to which invention relates

The invention relates to an expanding masonry attachment plug, preferably of plastics material, whose plug head has a wide insertion hole and whose shank, provided with a through hole, is divided by longitudinal slits or slots into expanding segments, which join at the far end to form a plug foot.

2. The prior art

Expanding masonry attachment plugs of a conventional type are so constructed that on insertion of the screw by twisting into the central guide hole of the shank the expanding segments, starting at the plug foot, expand or spread out and under the expanding pressure of the conically shaped wood screw come to lie against the wall of the hole made for the plug. In this classical form of expanding plug the expanding elements are only held together by means of narrow connecting pieces of the plug foot, the connecting pieces being intended to prevent a premature divergence of the segments on hammering the plug into a plug hole and consequent prodding against the wall of the hole. This prior art is represented for example by the British patent specification No. 589,648 and the Swiss patent specification No. 212.

In addition to these expanding masonry attachment plugs expanding plugs have recently been proposed in the case of which the expansion or spreading out of the segments is not brought about internally by driving home the screw with a screw driver and instead such an expansion is brought about by an axial stressing of the shank by screwing the screw into a nut arranged at the foot of the plug, the screw which is being driven home cutting its own female thread in a closed sleeve at the foot of the plug.

Masonry attachment plugs of the last-mentioned type have been proposed owing to the use on an increasing scale of constructional materials which have a low resistance or strength. Such materials include more particularly gas concrete, pumice-like materials or hollow building blocks. In the case of the use of conventional expanding masonry attachment plugs in such light-weight building blocks the high radial expanding forces cause a collapse of the cells adjacent to the wall of the hole so that there is no sufficiently high resistance opposing the expanding forces and secure attachment becomes impossible. The bending effect of the latter-mentioned type of expanding plug however leads to a very substantial expansion outwards and even in the case of spreading out within a cavity it is possible to ensure that the attachment cannot be pulled out again, because the bent expanding connecting pieces form an abutment, which catches behind the hole and acts as a source of blind rivet.

Masonry attachment plugs of the latter-mentioned type are described for example by the German Gebrauchsmuster Specification Nos. 1,860,318 and 1,935,793, the Swiss patent specification No. 486,644, the French patent specification No. 1,278,641 and the German patent specification (Offenlegungsschrift) No. 2,060,241.

However, such masonry attachment plugs operating with an axial clamping or stressing effect are not suitable for work in concrete and other solid or dense constructional materials because the radial spreading force can only be relatively small as a consequence of the axial stressing taking place in a hole properly dimensioned to suit the plug, for this force must be transmitted by the expanding elements themselves, which surround the screw which has been placed in position, in the manner of a bridge. Furthermore, in the case of an excessively pronounced axial stressing a destruction of the screw thread in the plug foot is to be feared.

SUMMARY OF INVENTION

One aim of the invention is therefore that of providing an expanding masonry attachment plug, which is suitable both for use in dense concrete and other dense building materials, and also in gas concrete, hollow building blocks and other light weight building materials including the connection of boards or plates, so as to have a univeral application.

The present invention consists in an expanding masonry attachment plug, preferably of plastics material, whose plug head has a wide insertion hole and whose shank, provided with a through hole, is divided by longitudinal slits or slots into expanding segments, which join at the far end to form a plug foot, characterised in that to enable use of the plug both in dense masonry material (concrete) and also in light weight building materials (gas concrete) the plug has the combination of the following features:

a. internally the expanding segments delimit a guide hole adapted to bring about expansion, with a diameter which is less than the diameter of the appropriate screw, and b. the plug foot consists of a closed sleeve adapted to bring about a bending outwards of the expanding segments by axial compression or clamping of the shank, with a through hole for the cutting of a tension thread on complete driving of the screw into position.

The plug constructed in such a manner adapts itself automatically to the circumstances obtaining so that the user does not have to undertake preliminary investigations as regards the material of which the wall is made and into which he has bored the plug hole. If it is a question of a wall consisting of dense concrete, there is a transmission over a large area of the expanding forces to the wall of the hole as soon as the screw has come into position in the guide hole of the shank, that is to say before it has been screwed into the plug foot so that even in the case of the use by mistake of a shorter screw sufficient purchase is obtained on the dense concrete. A screw with the correct dimensions, which is screwed into the plug foot, provides for a still higher pulling or tension force owing to the additional compression or upsetting of the plug shank which occurs as a result.

In the case of a plug hole brought in gas concrete or similar masonry the expansion brought about by twisting the screw into the guide hole alone cannot in itself ensure the necessary purchase being obtained, something which is made noticeable by the fact that it is relatively easy to go on turning the screw. On this further twisting or driving of the screw the latter then cuts a female thread in the plug foot and when the resistance is so large that the screw cannot be turned any further by hand one can at the same time be sure that the expanding segments have been bent outwards and that the plug has been reliably fixed in position. In extreme cases the axial stress can lead to the plug foot being drawn up as far as the closed sleeve head part.

This is for example also the case when the plug is used in a hollow building block or when bored is fixed or attachment is carried out in a hollow ceiling.

Further features will be found in the subordinate claims.

In order to provide a further security against being twisted out of position or to provide a locking action it is possible to provide annular ribs or axially extending ribs respectively on the plug casing in accordance with a further embodiment of the invention.

LIST OF SEVERAL VIEWS OF DRAWINGS

In what follows embodiments of the invention will be described with reference to the accompanying drawings.

DESCRIPTION OF PREFERRED EMBODIMENTS

Figure 1:
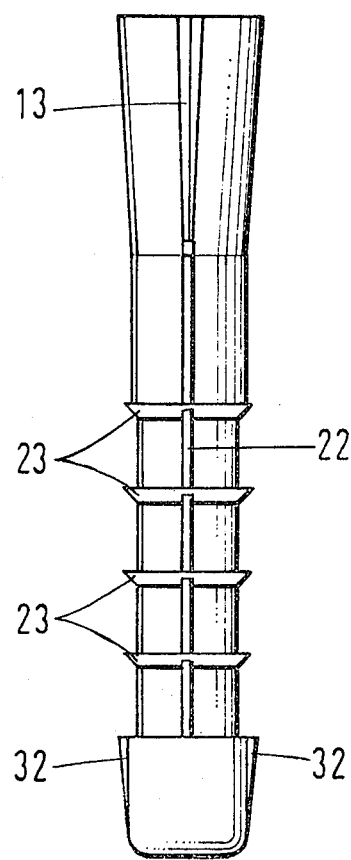
FIG. 1 shows a side view of a univeral masonry attachment plug constructed in accordance with the invention.
Figure 3:
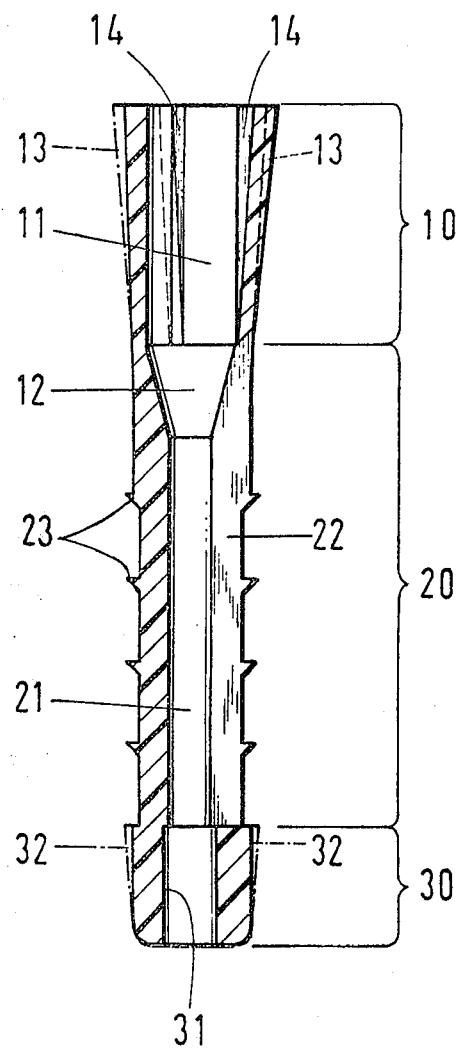
FIG. 3 shows a section on the line III—III of FIG. 2.
Figure 2:
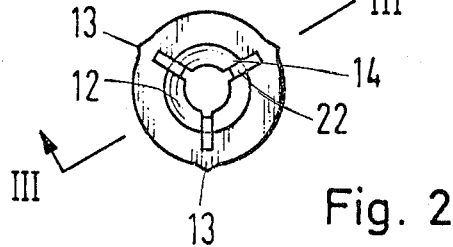
FIG. 2 shows a view looking in the direction of the axis of the plug in accordance with FIG. 1.

The plug in accordance with FIG. 1 comprises an external sleeve head 10, a central shank 20, and an inner foot 30. The wide cylindrical inner hole 11 of the sleeve head 10 is so dimensioned that on insertion of a matching screw into this head section no spreading or expanding effect is obtained. The shank 20 has a cylindrical guide hole 21, which in the upper part widens out in a conical section 20 towards the inner hole 11 of the head. On the slightly conically constructed external casing of the sleeve head 10 three axially extending ribs 13 with an even anguler spacing are arranged, whose height increases towards the outside. The shank is provided with three slits or slots 20 which run axially and have the same angular spacing between them. These slits form three expanding segments. Continuing these slits on the inner casing of the sleeve head 10 internal axial grooves 14 are constructed. The expanding segments of the shank 20 are provided with four annular ribs 22 having a saw-tooth section and arranged with an even axial spacing. The foot 30 consists of a closed sleeve and has, as compared with the hole 21 of the shank, a somewhat enlarged cylindrical hole 31 and is arranged to have a somewhat greater external diameter than the shank. This plug foot serves for the cutting of a screw thread by the screw which is to be screwed into the plug.

The hole 11 of the sleeve head is so constructed that on the insertion of a matching screw no expanding action occurs in order to prevent, for example, chipping off of wall plaster.

The driving home of the screw by twisting through the conical section 12 into the guide hole 21 involves the expansion of the three expanding segments of the shank 20 in an outward direction. In hard masonry, for example in dense concrete, this radial spreading or expanding force produces a satisfactory retaining action with a high resistance to tension load. The expansion is only carried out via the shank part 20, while on driving home the screw by twisting into the plug 30 no expansion can occur at the latter position, because the foot is made so thick that breaking is not to be feared. Therefore, the screw cuts its screw thread into the hole 31 so that the plug foot 30 acts as a screw nut, which is prevented from turning by axially running ribs 32. If the screw head is axially fixed at the outer plug end or the article to be fixed, further rotation of the screw in the female thread cut by it in the foot 30 will bring about an axial stressing in the shank part of the plug so that in porous masonry or in cavities the individual expanding segments will expand further or can even be bent outwards.

The plug in accordance with FIG. 4 again has an external sleeve head 10, a central shank part 20, and an inner foot 30. In addition to the axially extending ribs 13 of the sleeve head 10 the plug in accordance with FIG. 4 has in the shank section axially running ribs 24 which taper in an inward direction and merge with the shank. These ribs 24 are set in the direction of rotation of the screw when the latter is driven home in order to ensure a positive supporting action in the drilled hole. The ribs 13 are alined with the slots or slits 22 of the shank 20 while the ribs 24 are arranged respectively between two slits 22 so as to be offset in the peripheral direction with respect to the ribs 13.

Figure 4:
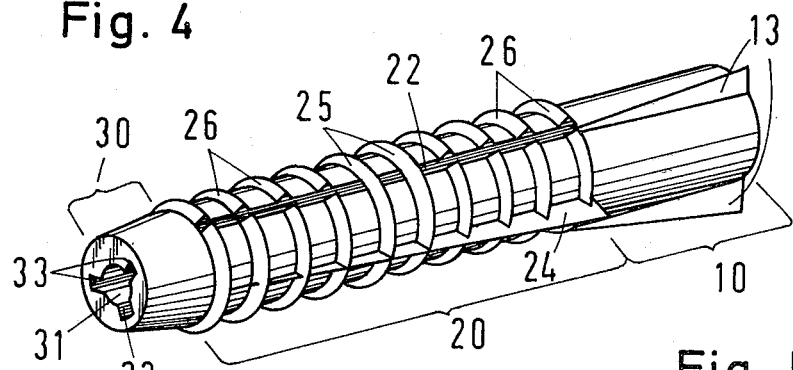
FIG. 4 shows in perspective a somewhat modified embodiment of a universal attachment plug constructed in accordance with the invention.

The plug foot 30 consists in the case of the embodiment in accordance with FIG. 4 of a conically extending sleeve so that the end of the plug is pointed, something which facilitates hammering the plug into a hole in the wall.

The cutting of the screw into the solid conical sleeve of the plug foot is facilitated because the hole 31 in the plug foot has three axial grooves 33 which are arranged with an constant angular spacing and have such a depth that while facilitating cutting of the thread there is no possibility of splitting open of the sleeve.

The slits 22 between the expanding segments of the shank are bridged over by two central annular ribs 25 so that a premature expansion is prevented when the plug is hammered into its receiving hole. The remaining ribs 26 extend respectively only over the expanding segments and leave the respective slit free.

Figure 5:
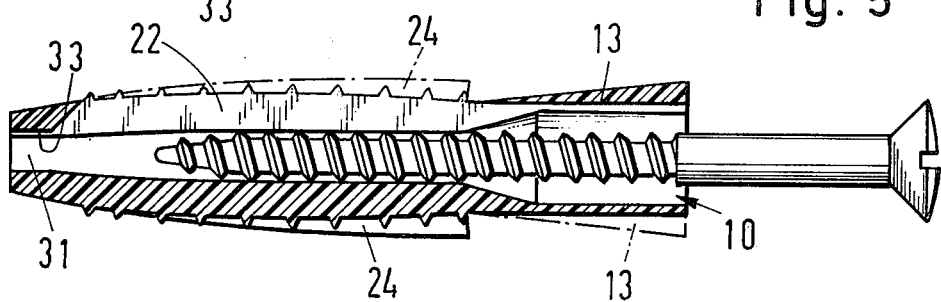
FIG. 5 is a sectional view of a plug of the embodiment in accordance with FIG. 4 after being placed in a plug hole in dense concrete and caused to expand.

FIG. 5 indicates that an expansion in the plug hole in the dense concrete wall will already have taken place before the tip of the screw is driven by twisting into the plug foot.

Figure 6:
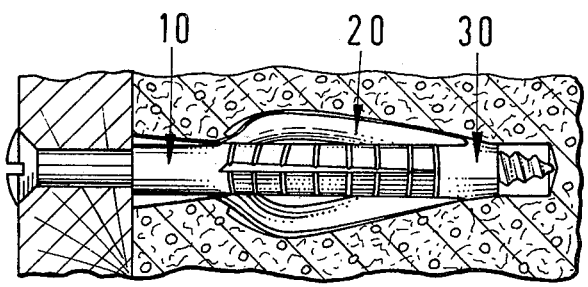
FIG. 6 shows the plug in accordance with FIG. 4 inserted into a foam or gas concrete wall.

FIG. 6 shows how by pulling on the nut formed by the plug foot the expanding segements are pressed into the porous light concrete and are held against being drawn out.

Figure 7:
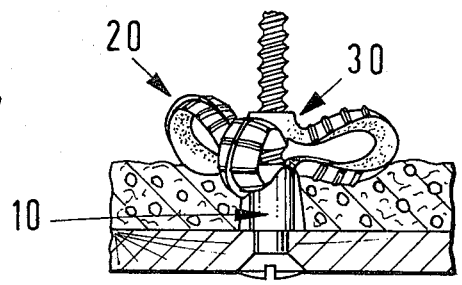
FIG. 7 shows a plug in accordance with FIG. 4 after expansion serving for attachment in a ceiling.

FIG. 7 finally shows the attachment of a board such as plaster board, in the case of which the plug foot sleeve 30 is drawn down practically as far as the sleeve head 10 and the expanding segments are spread out over a wide area. In this respect it is a question of attaching plaster board to form a ceiling.

I claim:

1. In combination a one-piece expanding masonry attachment plug and a threaded tightening screw:
   said masonry plug extending longitudinally and comprising, along its longitudinal length, a circumferentially continuous head at one end, a circumferentially continuous foot at the other end and a shank joining said head and said foot;

said head having a wide insertion hole extending through it to said shank; said shank having a substantially cylindrical exterior having a through guide hole therein extending continuously from said insertion hole to said plug foot;

said shank having a plurality of longitudinally extending slits arrayed about it and extending through said shank from its exterior into said through guide hole, thereby dividing said shank into flexibly expandable segments; all said segments being rejoined at and by said head and said foot, the exterior surfaces of said segments being provided with protuberance means for engaging the walls of a hole;

said foot having a through passage hole therethrough aligned with and of greater diameter than said shank through guide hole and smaller in diameter than the screw to be tightened into said through passage hole; an inside wall in said foot defining said through passage hole; said plug foot being sufficiently thick and strong so as not to expand upon a screw being tightened into said through passage hole;

said screw having a tapered lead-in portion and a cylindrical engaging portion with the major diameter of the cylindrical portion being less than the diameter of the insertion hole; said major diameter of said screw being greater than the diameter of said shank through guide hole at the part of said screw which seats inside said shank through guide hole; the shank of said screw having a length excluding said tapered lead-in portion which is greater than the distance from said one end of said plug to and including at least a portion of said foot through passage hole while said shank is not axially compressed; said major diameter of said screw also being greater than said foot through passage hole such that said screw is adapted to cut a thread into said foot inside wall;

said shank through guide hole along the portion of its length extending past said slits being defined by said shank segments to be narrower than said insertion hole and narrower than said major diameter of said screw;

said shank segments being outwardly bendable with respect to said through guide hole upon axial compression of said shank;

whereby a tension thread is cut in said foot as said screw is tightened through said foot, and further tightening of said screw draws said foot toward said head and axially compresses said shank.

2. The combination of claim 1, wherein said foot has an external diameter that is wider than the external diameter of said shank.

3. The plug of claim 1, wherein said shank through guide hole is cylindrical in shape and said plug includes a conically shaped section joining said insertion hole and said through guide hole.

4. The plug of claim 1, wherein said protuberance means comprise a plurality of annular ribs in spaced array along the exterior of said shank and having a saw-tooth cross-section.

5. The plug of claim 1 wherein said plug foot has an annular exterior on which are affixed longitudinally extending ribs which taper shorter in height toward the free end of said foot.

6. The plug of claim 1, wherein said plug foot is generally frusto-conical in shape, narrowing in cross-section toward its free end.

7. The plug of claim 1, wherein said screw receiving means in said plug foot comprises a through passage hole defined by walls formed in said foot and said through passage hole being aligned with said shank through guide hole;

a plurality of spaced apart, axially extending grooves formed in said foot through passage hole walls.

8. The plug of claim 1 further comprising a plurality of longitudinally extending support ribs arrayed around the exterior of said shank and aligned with and offset from said slits, and tapering shorter in height toward said plug foot.

9. The plug of claim 8 further comprising a plurality of separate, longitudinally extending second support ribs annularly arrayed around the exterior of said plug head and each being aligned with a respective said slit.

10. The plug of claim 4 wherein a first group of said annular ribs extend over said segments and extend across and bridge said slits and the remainder of said annular ribs extend over said segments, but not across said slits.

* * * * *